United States Patent
Militello et al.

(10) Patent No.: US 11,514,146 B2
(45) Date of Patent: Nov. 29, 2022

(54) RISK-BASED BIOMETRIC IDENTIFICATION AND AUTHENTICATION WITH TRUSTED SOURCE FOR SECURITY ACCESS

(71) Applicant: Nautilus Hyosung America, Inc., Irving, TX (US)

(72) Inventors: Joseph Militello, Miamisburg, OH (US); Keith Lennard, Charlotte, NC (US); James D. Barton, Miamisburg, OH (US)

(73) Assignee: Nautilus Hyosung America, Inc., Irving, TX (US)

( * ) Notice: Subject to any disclaimer, the term of this patent is extended or adjusted under 35 U.S.C. 154(b) by 313 days.

(21) Appl. No.: 16/938,877

(22) Filed: Jul. 24, 2020

(65) Prior Publication Data

US 2022/0027442 A1     Jan. 27, 2022

(51) Int. Cl.
| | |
|---|---|
| *G06F 21/32* | (2013.01) |
| *G06F 21/34* | (2013.01) |
| *G06F 21/60* | (2013.01) |
| *G06Q 20/10* | (2012.01) |
| *G06Q 20/20* | (2012.01) |
| *G06Q 20/40* | (2012.01) |
| *G06K 7/00* | (2006.01) |
| *G06Q 50/26* | (2012.01) |

(52) U.S. Cl.
CPC .............. *G06F 21/32* (2013.01); *G06F 21/34* (2013.01); *G06F 21/604* (2013.01); *G06K 7/0013* (2013.01); *G06Q 20/1085* (2013.01); *G06Q 20/206* (2013.01); *G06Q 20/4016* (2013.01); *G06Q 20/40145* (2013.01); *G06F 2221/2113* (2013.01); *G06F 2221/2153* (2013.01); *G06Q 50/265* (2013.01)

(58) Field of Classification Search
None
See application file for complete search history.

(56) References Cited

U.S. PATENT DOCUMENTS

| | | | |
|---|---|---|---|
| 6,898,299 B1 * | 5/2005 | Brooks | G07C 9/37 340/5.82 |
| 8,397,988 B1 * | 3/2013 | Zuili | G06Q 20/409 235/383 |
| 9,230,380 B2 * | 1/2016 | Marsden | G07C 9/00563 |
| 11,240,233 B2 * | 2/2022 | Kamal | H04L 63/0853 |

(Continued)

*Primary Examiner* — Fekadeselassie Girma
(74) *Attorney, Agent, or Firm* — Ferguson Braswell Fraser Kubasta PC

(57) ABSTRACT

A method including receiving, in a security device, a user object storing stored biometric data describing a biometric parameter of the user. Sensed biometric data is generating by sensing directly, using a sensor, the biometric parameter of the user. The stored biometric data is compared to the sensed biometric data. A confidence factor is determined using a first degree of trust, assigned to the object, combined with a second degree of match between the stored biometric data and the sensed biometric data. A user input is received indicating a desired activity. A risk factor is determined based on a combination of the confidence factor and the user input. The risk factor is compared to a selected pre-determined threshold. The user is granted a selected level of access to the security device from among different levels of access to the security device when the risk factor satisfies the selected pre-determined threshold.

20 Claims, 12 Drawing Sheets

(56) References Cited

U.S. PATENT DOCUMENTS

| | | | | |
|---|---|---|---|---|
| 11,361,315 B2* | 6/2022 | Vargas | ............... | G06Q 20/3415 |
| 2006/0219776 A1* | 10/2006 | Finn | .................... | G06K 7/0043 |
| | | | | 235/380 |
| 2009/0322477 A1* | 12/2009 | Celorio | ................. | G07C 9/257 |
| | | | | 340/5.82 |
| 2010/0328032 A1* | 12/2010 | Rofougaran | ........ | H04W 12/062 |
| | | | | 340/5.82 |
| 2013/0278422 A1* | 10/2013 | Friedman | ............... | G08B 25/10 |
| | | | | 340/541 |
| 2014/0085050 A1* | 3/2014 | Luna | .................... | H04W 12/33 |
| | | | | 340/5.82 |
| 2017/0068839 A1* | 3/2017 | Fukuda | ............... | G06V 40/113 |
| 2020/0356995 A1* | 11/2020 | Varma | .................. | G07F 19/201 |
| 2020/0366671 A1* | 11/2020 | Larson | ................. | H04L 9/3228 |
| 2021/0142607 A1* | 5/2021 | Mossoba | ................ | G06Q 20/40 |
| 2021/0295127 A1* | 9/2021 | Boudreau | ............ | B42D 25/305 |
| 2021/0321883 A1* | 10/2021 | Mcmahan | ........... | A61B 5/02055 |
| 2022/0027442 A1* | 1/2022 | Militello | ................ | G06F 21/34 |

* cited by examiner

RISK-BASED BIOMETRIC IDENTIFICATION AND AUTHENTICATION WITH TRUSTED SOURCE FOR SECURITY ACCESS

BACKGROUND

A technical problem arises in some kiosks that distribute cash or sensitive information due to security issues in view of certain data storage design parameters. Access to the kiosk should be secure in order to prevent unauthorized access to cash or sensitive information. Additionally, some kiosk owners desire to grant users of the kiosk differing levels of access to cash or sensitive information, depending on a risk level of the user. The risk level may be variable, not only between different users, but also for a given user at different times, depending on the kind of authentication information available. Additionally, some kiosk owners may also desire to avoid storing secure information about users of the kiosk. Thus, a technical challenge arises regarding how to secure a kiosk with different levels of authentication for the same or different users under different circumstances, but without storing information about the users.

SUMMARY

The one or more embodiments provide for a method. The method includes receiving, in a receptacle of a security device and from a user, an object storing stored biometric data describing a biometric parameter of the user. The method also includes reading the stored biometric data from the object. The method also includes generating sensed biometric data by sensing directly, using a biometric sensor of the security device, the biometric parameter of the user. The method also includes comparing the stored biometric data to the sensed biometric data. The method also includes determining a confidence factor using a first degree of trust, assigned to the object, combined with a second degree of match between the stored biometric data and the sensed biometric data. The method also includes receiving, from an input device of the security device, a user input indicating a desired activity to be taken with respect to the security device. The method also includes determining a risk factor based on a combination of the confidence factor and the user input. The method also includes comparing the risk factor to a selected pre-determined threshold. The method also includes granting, to the user, a selected level of access to the security device from among a plurality of levels of access to the security device when the risk factor satisfies the selected pre-determined threshold.

The one or more embodiments also provide for a method of operating an automated kiosk. The method includes receiving, in proximity to a receptacle of the automated kiosk and from a user, an identify device storing biometric data describing a biometric parameter of the user. The method also includes generating sensed biometric data by sensing directly, using a biometric sensor of the automated kiosk, the biometric parameter of the user. The method also includes comparing the stored biometric data to the sensed biometric data. The method also includes determining a confidence factor using a first degree of trust, assigned to the identify device, combined with a second degree of match between the stored biometric data and the sensed biometric data. The method also includes receiving, from an input device of the automated kiosk, a user input indicating a type of transaction desired by the user. The method also includes determining a risk factor based on a combination of the confidence factor and the user input. The method also includes comparing the risk factor to a selected pre-determined threshold. The method also includes preventing the user from performing the type of transaction when the risk factor fails to satisfy the selected pre-determined threshold.

The one or more embodiments also provide for a kiosk. The kiosk includes a receptacle disposed in a frame. The kiosk also includes a reader disposed to read an identity device placed in proximity to the receptacle. The kiosk also includes a display device connected to the frame. The kiosk also includes an input device connected to the frame and in electronic communication with the display device. The kiosk also includes a processor connected to the frame and in electronic communication with the display device and the input device. The kiosk also includes a biometric sensor connected to the frame and in electronic communication with the processor. The kiosk also includes a non-transitory computer readable storage medium connected to the frame and in electronic communication with the processor. The non-transitory computer readable storage medium stores computer readable program code which, when executed by the processor, performs a computer-implemented method of controlling one or both of the kiosk and software to which the kiosk has access. The computer-implemented method includes responsive to detecting insertion of the identity device in the receptacle, reading, from the identity device, stored biometric data describing a biometric parameter of a user. The computer-implemented method also includes generating sensed biometric data by sensing directly, using the biometric sensor, the biometric parameter of the user. The computer-implemented method also includes comparing the stored biometric data to the sensed biometric data. The computer-implemented method also includes determining a confidence factor using a first degree of trust, assigned to the identity device, combined with a second degree of match between the stored biometric data and the sensed biometric data. The computer-implemented method also includes receiving, from the input device, a user input indicating a transaction desired by the user. The computer-implemented method also includes determining a risk factor based on a combination of the confidence factor and the user input. The computer-implemented method also includes comparing the risk factor to a selected pre-determined threshold. The computer-implemented method also includes allowing, responsive to the risk factor satisfying the pre-determined threshold, the user to perform a transaction via the input device.

Other aspects of the invention will be apparent from the following description and the appended claims.

DETAILED DESCRIPTION

Figure 1:
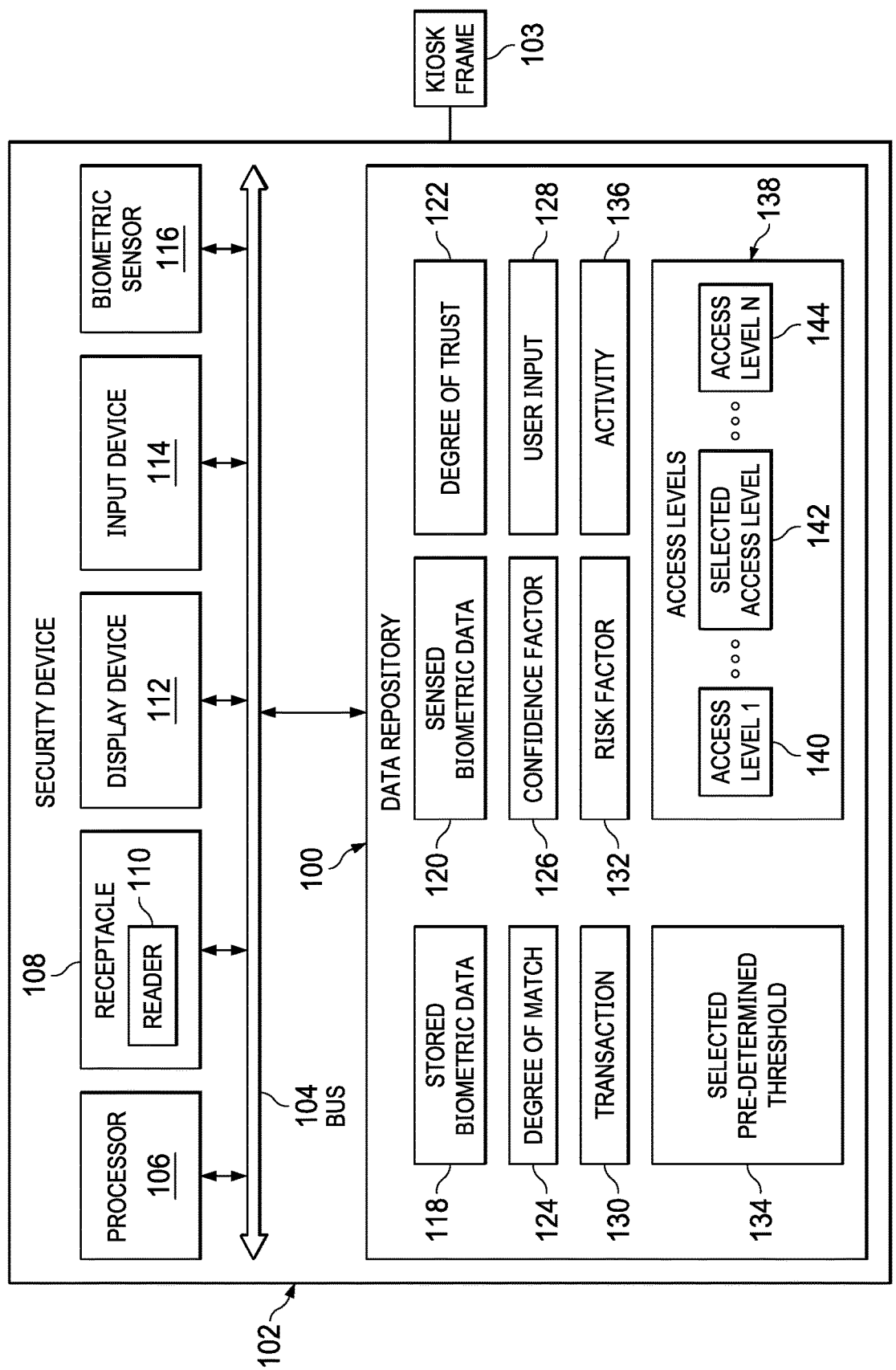
FIG. 1 shows a computing system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A was, at least at some point, separate from component B, but then was later joined to component B in either a fixed or removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

In general, embodiments of the invention relate to methods for securing a kiosk by granting users differing levels of authenticated access to the kiosk without the kiosk owner storing information about the user in the kiosk or elsewhere. The user of the kiosk provides, to the kiosk, an object storing biometric information about a biometric parameter of the user. A sensor associated with the kiosk directly senses the same biometric parameter of the user. Depending on the trustworthiness of the object, further depending on the degree of match between the sensed and stored biometric parameters, and further depending on the degree of access the user desires, a risk factor is determined. The risk factor is compared to a threshold. If the threshold is satisfied, then the desired level of access is granted. Otherwise, either the user is denied access to the kiosk, or is granted a lower level of access to the kiosk.

Additionally, the one or more embodiments addresses the technical problem of using biometric information to raise security levels without storing the biometric information. This technical problem is non-trivial. Additionally, even if a financial institution agrees to hold a biometric, the financial institution must convince customers to enroll. Customer enrollment takes time and manpower from the financial institution, and is an inconvenience to the customer. As a result, participation is low. With no enrollment, as in the one or more embodiments, participation is expected to be much higher. Enrollment also typically means only an financial institution's customers would enroll. However a financial institution has to cash checks drawn on their accounts whether the consumer is a customer or not. Thus, enrollment and storage of biometric information on the part of the financial institution is not a good solution to the issue of increased security.

The methods of the one or more embodiments address this technical problem because the one or more embodiments do not require user registration or enrollment in order to enhance security through the use of biometric information. The one or more embodiments also allow non-customers to cash checks using biometric validation without registering.

Attention is now turned to the figures. FIG. 1 shows a system, in accordance with one or more embodiments of the invention. The system includes a data repository (100), which may be characterized as either a non-transitory computer readable storage medium, or a temporary memory such as random access memory (RAM), or a combination thereof, depending on the phase of the kiosk access procedures described herein. In one or more embodiments of the invention, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The system shown in FIG. 1 also includes a security device (102) in communication with the data repository (100) via a bus (104). The security device (102) may be a kiosk in some embodiments, but may also be a lock box, a vault, a safe, a door, or some other security barrier connected to a processor (106) and the data repository (100). The data repository (100) may be part of the security device (102), or may be a remote data storage.

The security device (102) may include a receptacle (108) disposed in a frame of the security device (102), such as in kiosk frame (103). The receptacle (108) is sized and dimensioned to receive a pre-determined object from a user. For example, the receptacle (108) may be sized and dimensioned to receive a card from the user, or some other object such as but not limited to a flash drive, a memory chip, a physical token, or some other object used for storing pre-stored biometric data regarding the user. The object may be characterized as a "trusted source", as the object has been vetted in some manner and thus considered trustworthy. For example, the object may be a government-issued drivers license, a token provided by a financial institution, or many other different types of objects which have been associated in some manner with the user for use as a trusted source.

The receptacle (108) may also be associated with a motor, rollers, and other mechanical parts configured to move the object received from the user. For example, when a user initially inserts a card into the receptacle (108), the mechanical parts may be configured to pull the card deeper into the security device (102). However, in other embodiments, the receptacle (108) may be a swipe reader, and thus does not necessarily have to be fully enclosed within the security device (102).

Whatever type of receptacle (108) is used, a reader (110) is associated with the receptacle (108). The term "associated with the receptacle (receptacle (108)" means that the reader is in some manner physically disposed with respect to the receptacle (108) such that the reader (110) may, at some point, read the biometric information stored on the object after the user has deposited or swiped the object in or through the receptacle (108). For example, the reader (110) may be a magnetic strip reader inside a swipe slot of the receptacle (108), or the reader may be an optical scanning device disposed inside the security device (102) and oriented to optically scan the object once deposited in the receptacle (108). The reader (110) may also be a combination of several different types of readers, such as but not limited to an optical scanner, a magnetic reader, a microphone, etc. In any case, the reader (110) is disposed to read the object or other identify device placed in proximity to the receptacle (108).

The security device (102) may also include a display device (112) connected to the frame of the security device (102). The display device (112) may be a video screen, computer monitor, etc. The display device (112) is configured to display information to the user, as determined by the processor (106). The display device (112) is in electronic communication with the processor (106) via the bus (104).

The security device (102) also includes an input device (114). The input device (114) may be a touchscreen, a keypad, a keyboard, a mouse, a knob, etc., or a combination thereof. The input device (114) is configured to receive input from a user of the security device (102). For example, a user may use the input device (114) to provide information, request commands, respond to prompts, etc. The input device (114) is also in electronic communication with the processor (106) via the bus (104).

The security device (102) also includes a biometric sensor (116). The biometric sensor (116) may be of various different types, depending on the biometric parameter to be sensed. The biometric sensor (116) may be an array of biometric sensors of different types. The biometric sensor (116) may be an optical scanner, a gas analyzer, a fluid analyzer, a blood analyzer, etc. Software and/or hardware stored in the security device (102) and/or the data repository (100) is configured to directly measure and/or analyze a biometric parameter of the user. The term "directly measure and/or analyze" means that the biometric sensor (116) is configured to receive a sample from the user and then measure and/or analyze the sample.

For example, the biometric sensor (116) may be an optical sensor. In this case, the biometric sensor (116) may take an image of the user's face. The biometric sensor (116) and/or the processor (106) may then analyze various features of the user's face using facial recognition technology. Alternatively, the biometric sensor (116) may take an image of a user's fingerprint. The biometric sensor (116) and/or the processor (106) may then analyze various features of the user's fingerprint using fingerprint recognition technology.

In yet another alternative, the biometric sensor (116) may take an image of the user's retina. The biometric sensor (116) and/or the processor (106) may then analyze various features of the user's retina using retina recognition technology.

Different types of biometric sensors are also contemplated. The biometric sensor (116) may be an electro-sensor configured to measure a user's heart rhythm. The biometric sensor (116) may be a fluid analyzer which analyzes a saliva or blood sample provided by the user. The biometric sensor (116) may be a DNA analyzer configured to analyze the DNA of a sample provided by a user. Many different types of biometric sensors are contemplated.

Additionally, as indicated above, the biometric sensor (116) may be an array or suite of biometric sensors, such as those described above. In this case, the user may provide an object that stores multiple different kinds of biometric data regarding the user. Alternatively, the user may be prompted to provide different security objects in more than one receptacle of the security device (102). In any case, the biometric sensor (116) is in electronic communication with the processor (106) via the bus (104).

Attention is now returned to the data repository (100). As indicated above, the data repository (100) may be characterized as a combination of transitory and non-transitory computer readable storage media connected to the frame and in electronic communication with the processor (106). The non-transitory computer readable storage medium stores computer readable program code which, when executed by the processor (processor (106)), performs a computer-implemented method of controlling one or both of the security device (102) (e.g., a kiosk) and software to which the security device (102) has access. The transitory storage (e.g., RAM) may temporarily store biometric information, as described below. The method may be any of the methods of FIG. 2 through FIG. 4I, and is described further with respect to those figures.

For example, the data repository (100) may be a considered transitory medium (e.g., RAM) with respect to stored biometric data (118) and sensed biometric data (120). The stored biometric data (118) is pre-stored biometric data regarding biometric parameters of a user. The stored biometric data (118) is stored on the object that the user provides to the receptacle (108) of the security device (102). The stored biometric data (118) is read by the reader (110), but then is only temporarily stored in the transitory media of the data repository (100) for comparison purposes. Due to the desired design parameter that any form of biometric information should not be stored permanently in the security device, the stored biometric data (118) is not stored in the non-transitory computer readable storage medium or in any cloud-based storage service. Rather, again, the stored biometric data (118) is only "stored" information because the data is pre-stored on the object provided by the user.

For example, the object may be a driver's license belonging to the user. The driver's license includes a picture of the user's face, as well as a magnetic stripe storing other biometric information about the user, such as for example the user's blood type. The stored biometric data (118), in this case, is the features of the user's face as reflected in the picture of the user, as well as the user's blood type. While the stored biometric data (118) will be provided to temporary memory of the data repository (100) so that the processor (106) can process the stored biometric data (118), the stored biometric data (118) is not stored in the non-transitory media (e.g., hard drive or cloud service) of the security device (102).

The transitory portion of the data repository (100) also may temporarily store the sensed biometric data (120). The sensed biometric data (120) is data sensed by the biometric sensor (116). For example, the sensed biometric data (120) may be a picture taken of the user at the security device (102), a fingerprint of the user taken at a fingerprint reader to the security device (102), etc. Again, the sensed biometric data (120) is not stored in the non-transitory computer readable storage medium of the security device (102), or elsewhere, and is discarded after the security processes described with respect to FIG. 2 through FIG. 4I have been performed.

The data repository (100) also may store a degree of trust (122). The degree of trust (122) is a pre-determined number and/or a set of rules that indicate the degree of trustworthiness that is assigned to the object deposited or swiped by the in or through the receptacle (108). For example, a driver's license may be considered a more trustworthy source of biometric data than a credit card imprinted with a picture of the user, due to the extra security precautions assumed to have been taken by the authority issuing the driver's license. Thus, the driver's license may be assigned a higher degree of trust (122) than the credit card imprinted with the user's picture. The degree of trust (122) may be stored in the permanent non-transitory computer readable storage medium of the data repository (100).

The degree of match (124) may also be stored in the transitory media of the data repository (100). The degree of match (124) is the degree of match between the stored biometric data (118) and the sensed biometric data (120).

The degree of match (124) may be expressed as a percentage, a level, or some other convenient form. For example, if the stored biometric data (118) and the sensed biometric data (120) exactly correspond, then the degree of match (124) may be "100%". However, the stored biometric data (118) and the sensed biometric data (120) might not exactly correspond. For example, a driver's license may have an older picture of the user (i.e., the stored biometric data (118)) such that the current picture (i.e., the sensed biometric data (120)) and the picture on the driver's license will not match exactly. For example, the user may have aged a number of years, experienced a hair color change, gained or lost weight, etc. In this case, the degree of match might be "90%" or some other number. If the stored biometric data (118) and the sensed biometric data (120) are substantially different, such as when someone other than the user is in position of the driver's license, the degree of match (124) may be low, such 10% or lower.

The confidence factor (126) may also be stored in the transitory media of the data repository (100). The confidence factor (126) is an expression of the combination of the degree of trust (122) and the degree of match (124). In other words, the confidence factor is determined using a first degree of trust (122), assigned to the object, combined with a second degree of match between the stored biometric data (118) and the sensed biometric data (120). For example, the confidence factor (126) may be a multiplication of the degree of trust (122) by the degree of match (124). The confidence factor (126) may be determined according to a more complex rule. Generally, the greater the degree of trust (122), the greater the confidence factor (126). Similarly, the greater the degree of match (124), the greater the confidence factor (126).

The user input (128) may be input provided by the user and received by the security device (102). The user input (128) may be stored either in the transitory or the non-transitory portions of the data repository (100), depending on the type of input the user has provided. For example, an amount of cash retrieved from the security device may be stored permanently as an account transaction, whereas an entered pin number may be stored only temporarily in the transitory memory and then discarded.

A transaction (130) may also be stored in the data repository (100). The transaction (130) is data and/or a set of commands requested by a user. For example, the transaction (130) may be to request the security device (102) to grant access, to provide cash to the user, to transfer money between electronic accounts, to set or apply user preferences, to manage a user's online account, and the like. Generally the transaction (130) is stored in the transitory part of the data repository (100), but aspects of the transaction (130) may be stored in the non-transitory computer readable storage medium of the data repository (100), such as when the user changes account information, or the transaction is recorded for banking purposes.

A risk factor (132) may also be stored in the data repository (100). The risk factor (132) is a number or a set of numbers that reflect an estimation of the level of risk exposure to the owner of the security device (102). The nature of the risk depends on what the security device (102) protects. For example, the risk may be that the security device (102) will dispense cash to a person other than the owner of the account, the risk may be that an electronic transaction is fraudulent, or many different types of risks. The nature of the risk is known based on the type of transaction or electronic to be performed, and is factored into rules which define the evaluation of the risk factor (132). The risk factor (132) also may depend on other factors, such as the type of object being used to supply the stored biometric data (118), the nature of the stored biometric data (118), the degree of trust (122), the sensitivity of the information to be manipulated, etc. For example, the risk factor (132) may be higher when the stored biometric data (118) is a less reliable type of identifier (facial recognition) relative to some other type of identifier (retinal scan), may be lower when the user also supplies concurrently a password, may be higher when the user desired administrative level access, etc. In any case, the risk factor (132) is a number or a set of numbers, determined by rules, that indicates how risky it is to the owner of the security device (102) to grant the desired level of access.

A selected pre-determined threshold (134) may also be stored in the non-transitory computer readable storage medium portion of the data repository (100). The selected pre-determined threshold (134) is a number or a set of numbers used for comparison purposes. In particular, the selected pre-determined threshold (134) is compared to the risk factor (132). The threshold determines whether the security device (102) grants the requested access. The selected pre-determined threshold (134) may also be considered to be multiple thresholds. For example, the security device (102) may deny access to a first level of access when the selected pre-determined threshold (134) is below a first risk factor, but may grant a lower, second level of access when the selected pre-determined threshold (134) is above a second risk factor that is less than the first risk factor.

The data repository (100) may also store or execute a variety of different activities that might be requested by a user, such as activity (136). For example, an activity might be to change an account from one state to another state. An activity might be to dispense cash and then deduct the dollar amount from the user's account. Many different activities are contemplated.

The data repository (100) may also store different access levels (138). A level of access is a rule that defines what services may be accessed through the security device (102) or what physical aspects are accessible in the security device (102). For example, a level of access may be a rule which defines that a first drawer in the security device (102) may be opened, but not a second drawer. A level of access may be administrative privileges to manipulate accounts at one level, but only minimal access privileges at another level.

There may be many access levels (138). Thus, for illustrative purposes, FIG. 1 shows access level 1 (140), selected access level (142), and access level N (144), each of which are examples of access levels (138). Access level 1 (140) may be an entry level of access, which might enable a user to designate or otherwise set or apply user preferences such as what language is used to display instructions on the security device (102). The selected access level (142) is the level of access that is selected to be granted to the user by the security device (102). Many other access levels (138) may be present. Thus, FIG. 1 shows "access level N (144)", which represents an "Nt$^h$" access level, where "N" is a number.

While FIG. 1 shows a configuration of components, other configurations may be used without departing from the scope of the invention. For example, various components may be combined to create a single component. As another example, the functionality performed by a single component may be performed by two or more components.

Figure 2:
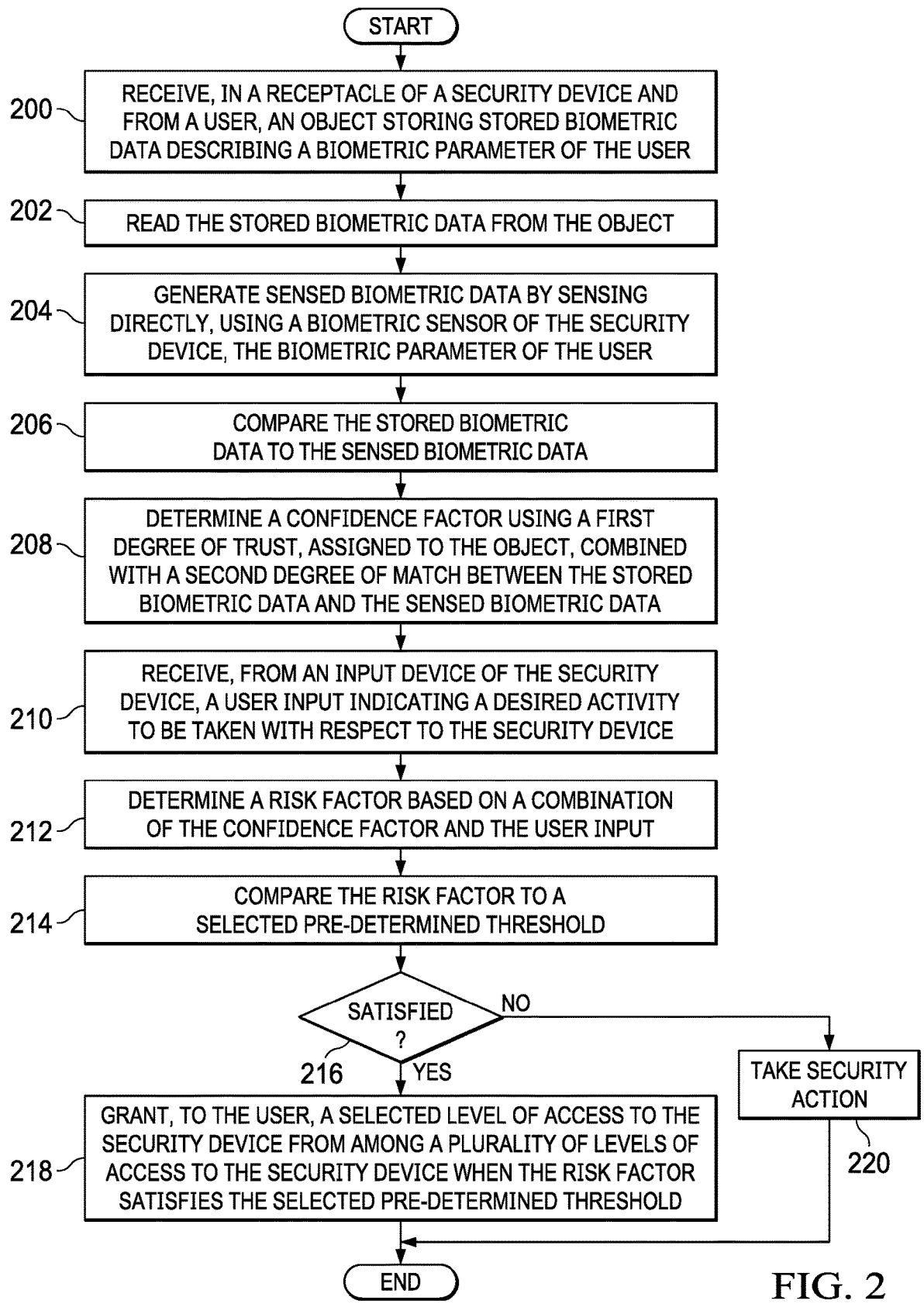
FIG. 2, FIG. 3, FIG. 4A, FIG. 4B, FIG. 4C, FIG. 4D, FIG. 4E, FIG. 4F, FIG. 4G, FIG. 4H, FIG. 4I, and FIG. 4J show different flowcharts for securing a kiosk, in accordance with one or more embodiments of the invention.

FIG. 2 shows a method of granting a selected level of access with respect to a security device, such as security device (102) of FIG. 1. The method of FIG. 2 may be implemented using the security device (102) of FIG. 1, or by a remote processor in communication with the security device (102).

At step 200, an object is received in a receptacle of a security device, the object storing stored biometric data describing a biometric parameter of the user. The object may be received from a user. For example, when the receptacle is a swipe card reader, receiving the object may include scanning a magnetic strip on the card as the card is swiped through the swipe card reader. In another example, the receptacle might be a mechanical system of rollers which draws a card into the security device for scanning. Thus, "receiving" may be an active step taken by the security device (e.g., drawing the card into the card reader) or a passive step (e.g., allowing a user to swipe a card through the card reader). However, many different technique may be used to receive the object, such as but not limited to establishing an electronic communication through a USB port or some other electronic device, receiving a wireless transmission, etc.

At step 202, the stored biometric data is read from the object. The stored biometric data may be read by a number of different techniques, such as optical scanning, magnetic reading, optical character recognition, etc.

At step 204, sensed biometric data is generated by sensing directly, using a biometric sensor of the security device, the biometric parameter of the user. For example, a camera on the security device may take an image of the user's face. In another example, the security device might prompt the user to place the user's finger on a scanner in the security device in order to read the user's fingerprint. In still another example, the security device might have a retinal scanner and prompt the user to place the user's eye in front of the retinal scanner. In yet another example, the security device might weigh the user, prompt the user for a sample of biological material, or otherwise directly sense the user's biological parameter of interest.

At step 206, the stored biometric data is compared to the sensed biometric data. The comparison is performed by determining differences between the stored biometric data and the sensed biometric data. Comparing results in a degree of match between the sensed biometric data and the stored biometric data.

At step 208, a confidence factor is determined using a first degree of trust, assigned to the object, combined with a second degree of match between the stored biometric data and the sensed biometric data. The confidence factor is determined using pre-determined rules applied by the processor. The rules take into account the degree of trust assigned to the object as well as the degree of match. Generally, the greater of degree of trust assigned to the object, the greater the confidence factor. Similarly, the greater the degree of match, the greater the confidence factor. Weights may be applied to increase the contribution of the degree of trust and/or the degree of match, possibly depending on the type of object, the type of biometric parameter, and possibly other factors such as the level of access requested by the user.

At step 210, a user input is received from an input device of the security device, the user input indicating a desired activity to be taken with respect to the security device. The user input may be entered via a keypad, touch screen, knob, audio command, other types of input, and combinations thereof.

At step 212, a risk factor is determined based on a combination of the confidence factor and the user input. The risk factor is determined using pre-determined rules executed by the processor. Generally, the higher the confidence factor, the lower the risk factor. Additionally, the greater the level of access being requested by the user input, the higher the risk factor. The nature of the user input may also factor into the determination of the risk factor, such as for example a user input accompanied by a password may be decrease the risk factor. In another example, if the user input is only to make a deposit, then the risk factor may be decreased. However, if the user is requesting administrative access to an automatic teller kiosk, then the risk factor may be high.

At step 214, the risk factor is compared to a selected pre-determined threshold. Comparison is performed using pre-determined rules executed by the processor. Comparing determines whether the risk factor is greater than, equal to, or less than the risk factor. Generally, if the risk factor is greater than the threshold, then some security action is taken, such as to deny access. If the risk factor is less than the threshold, then the requested level of access is granted.

At step 216, a determination is made whether the pre-determined threshold is satisfied. The pre-determined threshold is "satisfied" when the processor determines that the rule defining the comparison is satisfied. For example, the selected level of access may be granted when the risk factor is less than the pre-determined threshold. However, depending on how the rule is structured, it may be that satisfaction occurs when the risk factor is greater than or equal to the pre-determined threshold.

At step 218, after a "yes" determination at step 216, the user is granted a selected level of access to the security device from among two or more levels of access to the security device; i.e., when the risk factor satisfies the selected pre-determined threshold. The grant of the selected level of access depends on the nature of the security device and the requested action. For example, grant of security access may include allowing the user to designate user preferences; allowing the user to enter additional security information in order to access a higher level of access relative to the selected level of access; opening the security device; allowing the user to withdraw a pre-determined number of objects from the security device; and allowing the user to perform a first selected transaction within a software program with which the security device is in communication, but also preventing the user from performing a second selected transaction within the software program, wherein performing the second selected transaction requires a higher level of access than the selected level of access. In another example, grant could be carried out by unlocking a door, or opening one of many drawers in the security device. Many different types of security access grant are contemplated.

However, at step 220, after a "no" determination at step 216, a security action is taken when the risk factor does not satisfy the pre-determined threshold. The security action may take many different forms. For example, the security action may be to request the user to provide a secondary form of identification, connect the security device to a live security agent to further verify the user, and preventing the user from accessing a higher access level that is higher than the selected level of access. The security action also may be to deny entry to a secured door, drawer, or other physical container. The security action may be to deny the user access to the requested accounts. The security action may be to deny dispensing cash from an automated teller kiosk. The security action may be to inform a security officer, call the police, freeze an account, or any other desired security action.

In one embodiment, the method of FIG. 2 may terminate thereafter. However, in other embodiments, the method may be varied.

For example, the method may also include selecting the selected pre-determined threshold from among two or more pre-determined thresholds. In this case, selecting is performed by using the confidence factor and the user input to select a security rule, and then applying the security rule to the risk factor to select the selected pre-determined threshold.

In another variation, the method may also include, prior to generating the sensed biometric data, prompting a user to input a passcode; receiving, from the user, an entered passcode; comparing the entered passcode to a known passcode; and responsive to the entered passcode being different than the known passcode, taking a security action.

Figure 3:
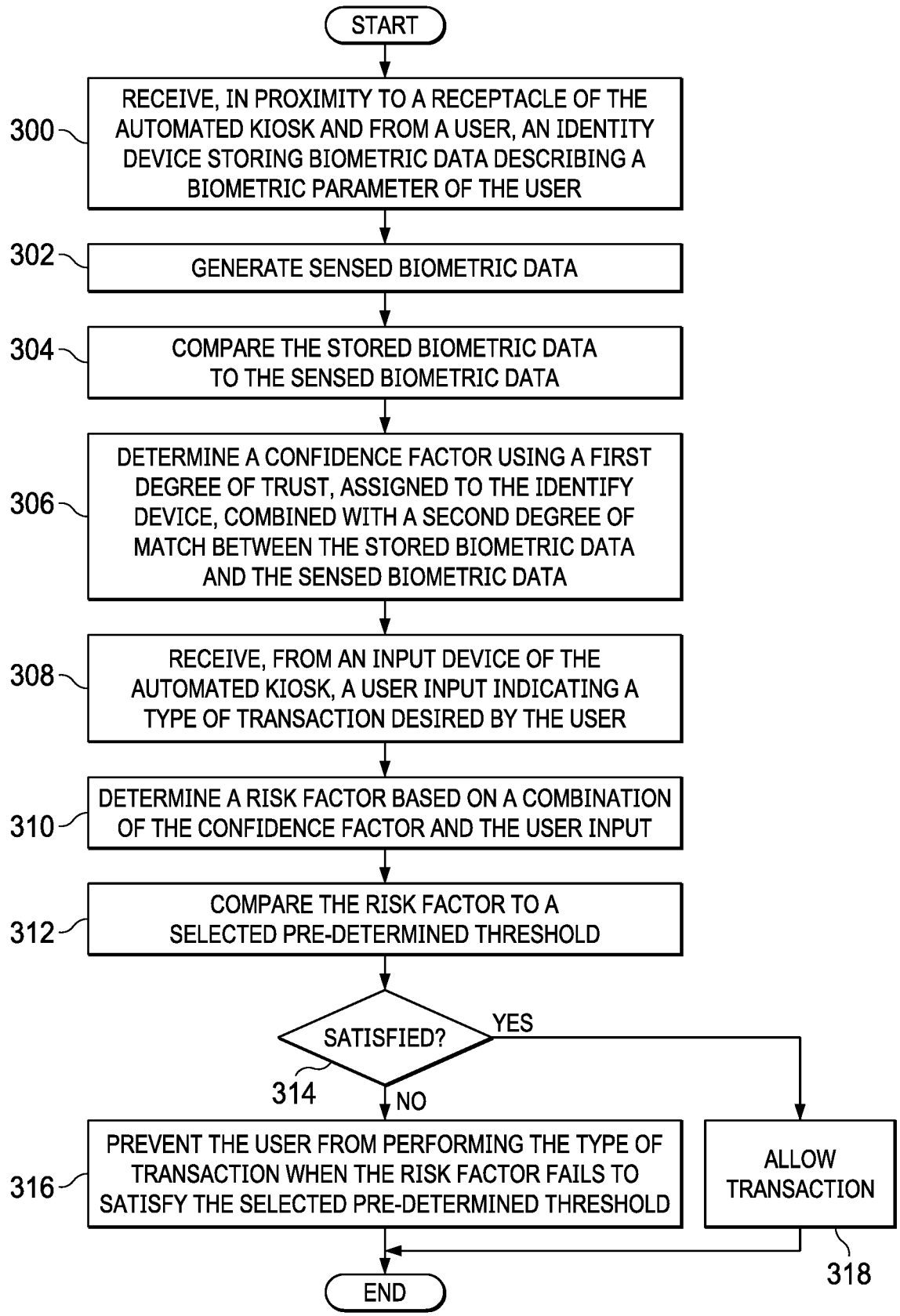

FIG. 3 is a flowchart of a method of operating an automated kiosk. The method may be implemented using the system shown in FIG. 1. The method of FIG. 3 is a variation of the method of FIG. 2.

At step 300, an identify device receives, in proximity to a receptacle of the automated kiosk and from a user, an identity device storing biometric data describing a biometric parameter of the user. The identity device may be received "in proximity to a receptacle" by swiping the identity device through the receptacle, by inserting the identity device into the receptacle, by passing the identity device near enough to the receptacle for an optical or magnetic scan, etc.

At step 302, sensed biometric data is generated. The sensed biometric data may be generated by sensing directly, using a biometric sensor of the automated kiosk, the biometric parameter of the user. Sensing the biometric data may be accomplished as described with respect to step 204 of FIG. 2.

At step 304, the stored biometric data is compared to the sensed biometric data. Comparison may be performed as described with respect to step 206 of FIG. 2.

At step 306, a confidence factor is determined using a first degree of trust, assigned to the identify device, combined with a second degree of match between the stored biometric data and the sensed biometric data. Determination of the confidence factor may be performed as described with respect to step 208 of FIG. 2.

At step 308, a user input is received from an input device of the automated kiosk, the user input indicating a type of transaction desired by the user. Receipt of the user input may be performed as described with respect to step 210 of FIG. 2.

At step 310, a risk factor is determined based on a combination of the confidence factor and the user input. Determination of the risk factor may be performed as described with respect to step 212 of FIG. 2.

At step 312, the risk factor is compared to a selected pre-determined threshold. Comparison may be performed as described with respect to step 214 of FIG. 2.

At step 314, a determination is made whether the pre-determined threshold is satisfied. Determination of satisfaction of the pre-determined threshold may be performed as described with respect step 216 of FIG. 2.

At step 316, after a "no" determination" at step 314, the user is prevented from performing the type of transaction when the risk factor fails to satisfy the selected pre-determined threshold. Otherwise, at step 318, a "yes" determination at step 314, the user is allowed to perform the type of transaction.

The method shown in FIG. 3 may be varied. For example, responsive to preventing the user from performing the type of transaction, the user may be prompted to provide additional authentication. In this case, responsive to providing the additional authentication, the user is allowed to perform the type of transaction. In another variation, responsive to preventing the user from performing the type of transaction, a remote device operable by a remote user (e.g., a teller) may be contacted. In this case, an authentication requested by the remote user may be communicated via the remote device and the automated kiosk to the user. Responsive to a command transmitted from the remote device to the automated kiosk, the user may be allowed to perform the type of transaction, or may be denied if the remote user denies the transaction.

In another embodiment, the user may be allowed to perform a second transaction, different than the transaction. The second transaction is associated with second risk factor that satisfies a second selected pre-determined threshold. For example, a different transaction may be allowed if the risk factor satisfies a different, lower pre-determined threshold.

In another variation, the method may include, prior to generating the sensed biometric data, prompting a user to input a passcode; receiving, from the user, an entered passcode; comparing the entered passcode to a known passcode; and responsive to the entered passcode being different than the known passcode, taking a security action. In still another variation, the user still might be allowed to perform the type of transaction if another, subsequent biometric parameter is provided.

For example, after preventing the performance of the type of transaction, the user may be prompted to provide to the automated kiosk a different type of identification storing a second stored biometric parameter, different than the stored biometric parameter. In this case, second sensed biometric data may be generated by sensing directly, using a second biometric sensor of the automated kiosk, the second biometric parameter of the user. The second stored biometric parameter is compared to the second sensed biometric data. A second confidence factor is determined using a third degree of trust, assigned to the different type of identification, combined with a fourth degree of match between the second stored biometric data and the second sensed biometric data. A second risk factor is determined based on a combination of the second confidence factor and the user input. The second risk factor is compared to a second selected pre-determined threshold. The user to perform the type of transaction when the second risk factor satisfies the second selected pre-determined threshold.

FIG. 4A through FIG. 4I show different security methods according to the one or more embodiments described above. Each of the methods shown in FIG. 4A through FIG. 4I may be implemented using the system shown in FIG. 1, or the computing systems shown in FIG. 5A and FIG. 5B. The methods shown win FIG. 4A through FIG. 4I may be considered variations of the methods shown in FIG. 2 and FIG. 3. The methods shown in FIG. 4A through FIG. 4I are described as being performed by a kiosk, for purposes of example. However, the term "kiosk" could also be replaced more generally by the term "security device," as described with respect to FIG. 1. The methods shown in FIG. 4A through FIG. 4I are exemplary only, and do not necessarily limit the other embodiments described herein.

Figure 4A:
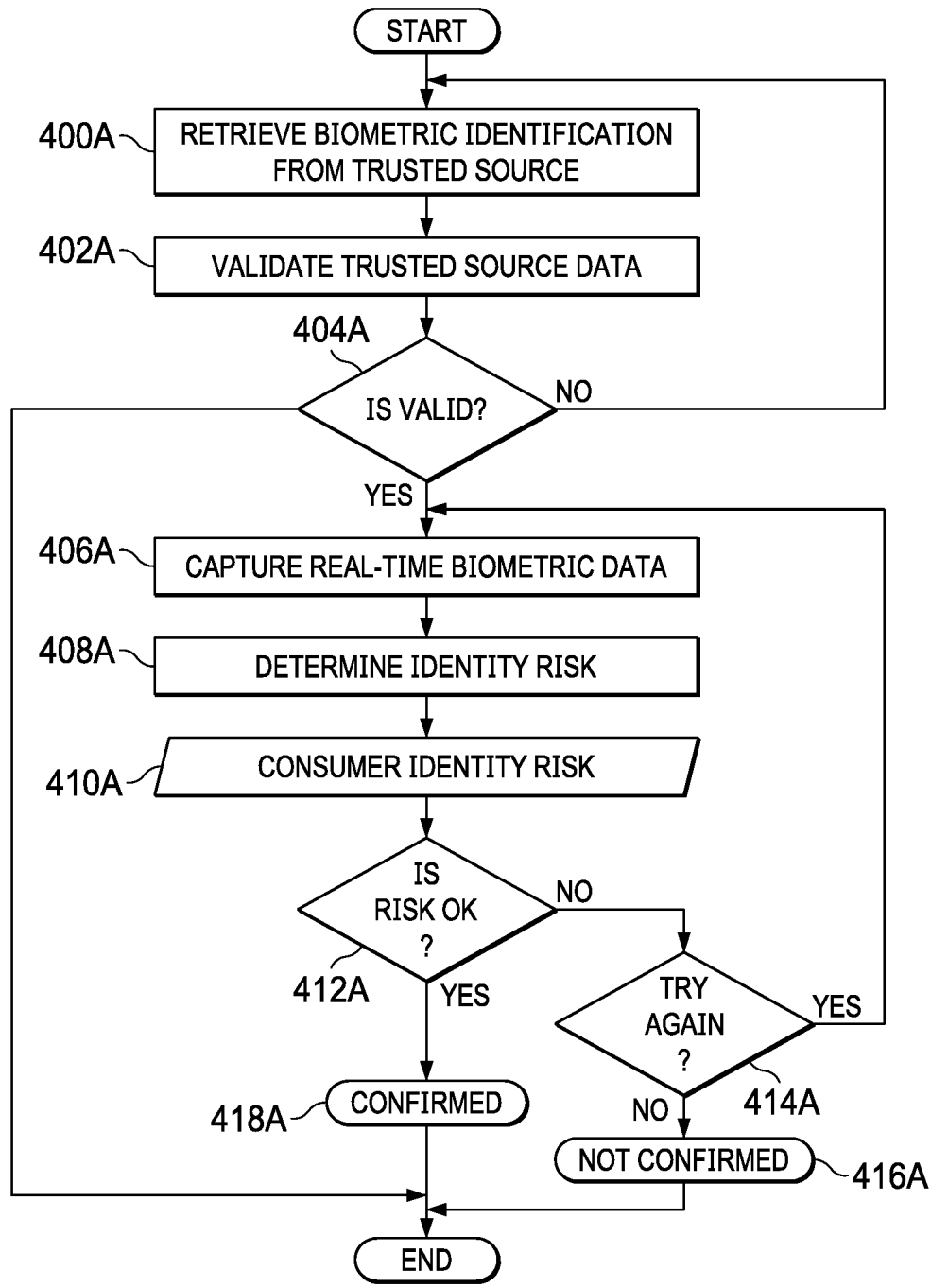

FIG. 4A is a flowchart illustrating a method of determining an identity risk, in accordance with one or more embodiments. At step 400A, the kiosk retrieves biometric information from a trusted source, such as the object described with respect to FIG. 1.

At step 402A, the kiosk validates the trusted source as a trusted source of data. For example, the trusted source may be subject to a verification procedure, such as to check for a known marker in a government issued identification card which is known to be difficult to counterfeit.

At step 404A, the kiosk determines whether the trusted source is valid. If the trusted source is not valid (a "no" determination at step 404A), then the kiosk rejects the trusted source and the process repeats in order for the user to either try again or to provide another, different trusted source. Alternatively, the method may terminate.

However, if the trusted source is valid (a "yes" determination at step 404A), then at step 406A the kiosk captures real-time biometric data about the user. At step 408A, the kiosk determines an identity risk for the user, based on the nature of the transaction, the type of biometric information, the degree of trust assigned to the object, etc., as described above with respect to FIG. 1 through FIG. 3. At step 410A, the kiosk then compares the consumer identity risk to a pre-determined set of rules.

At step 412A, the kiosk determines whether the risk is "OK" (i.e., satisfied). If "yes" at step 412A, then the user's identity is confirmed, and the kiosk allows the user to continue the desired use of the kiosk at step 418A.

However, the security check method is terminated. Otherwise, for a "no" result at step 412A, then at step 414A the kiosk makes another determination whether to try again. If so (a "yes" determination at step 414A), then the process repeats from step 406A. Otherwise, (a "no" determination at step 414A), then the kiosk determines at step 416A that the identity is not confirmed, and the method terminates.

Figure 4B:
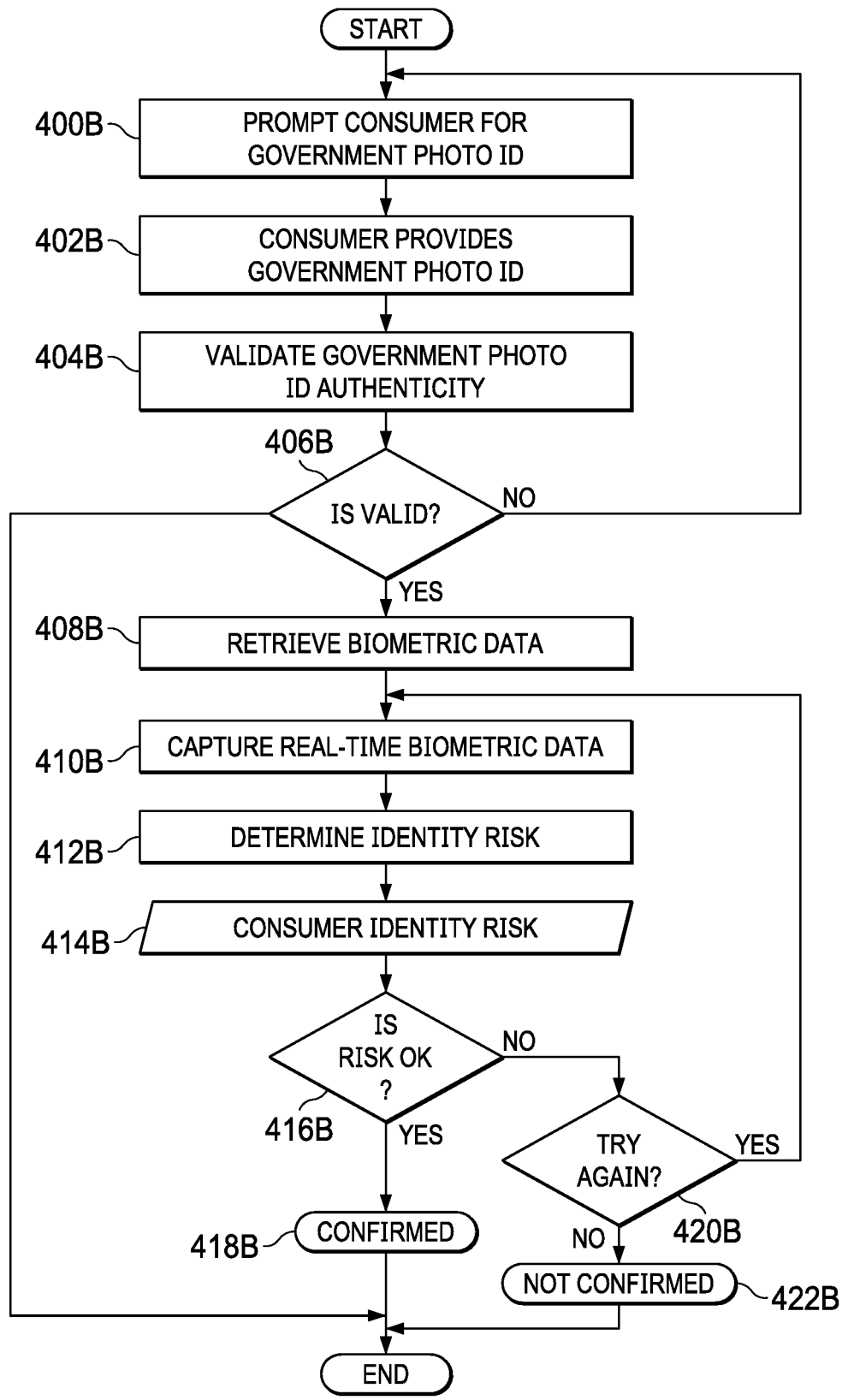

FIG. 4B is a flowchart illustrating a more specific example of FIG. 4A by performing identity risk determination using a government issued identification and facial recognition, in accordance with one or more embodiments. At step 400B, the kiosk prompts the consumer for a government photo identification. At step 402B, the consumer provides the government photo identification to a receptacle on the kiosk. At step 404B, the kiosk validates an authenticity of the government photo identification.

At step 406B, the kiosk then determines whether the government photo identification is valid. If the government photo identification is not valid, then the process may return to step 400B and repeat, either to retry the process with the government photo identification or to provide a new government photo identification. Alternatively, the method my terminate.

However, if the kiosk determines that the government photo identification is valid (a "yes" determination at step 406B), then at step 408B the kiosk retrieves biometric data from the government photo identification. For example, the kiosk may scan the photograph of the consumer's face.

Then, at step 410B, the kiosk captures real-time biometric data regarding the consumer. For example, the kiosk my take a photograph of the user's face.

At step 412B, the kiosk determines an identity risk for the consumer. The determination of the identity risk depends on the degree of match between the face in the government photo identification and the face in the photograph that the kiosk took, the level of access desired by the user, etc., as described with respect to FIG. 1 through FIG. 3. At step 414B, the kiosk then compares the consumer identity risk to a pre-determined set of rules.

At step 416B, the kiosk determines whether the risk is "OK" (i.e., satisfied). If "yes" at step 416B, then the user's identity is confirmed, and the kiosk allows the user to continue the desired use of the kiosk at step 418B. However, the security check method is terminated. Otherwise, for a "no" result at step 416B, then at step 420B the kiosk makes another determination whether to try again. If so (a "yes" determination at step 420B), then the process repeats from step 410B. Otherwise, (a "no" determination at step 420B), then the kiosk determines at step 422B that the identity is not confirmed, and the method terminates.

Figure 4C:
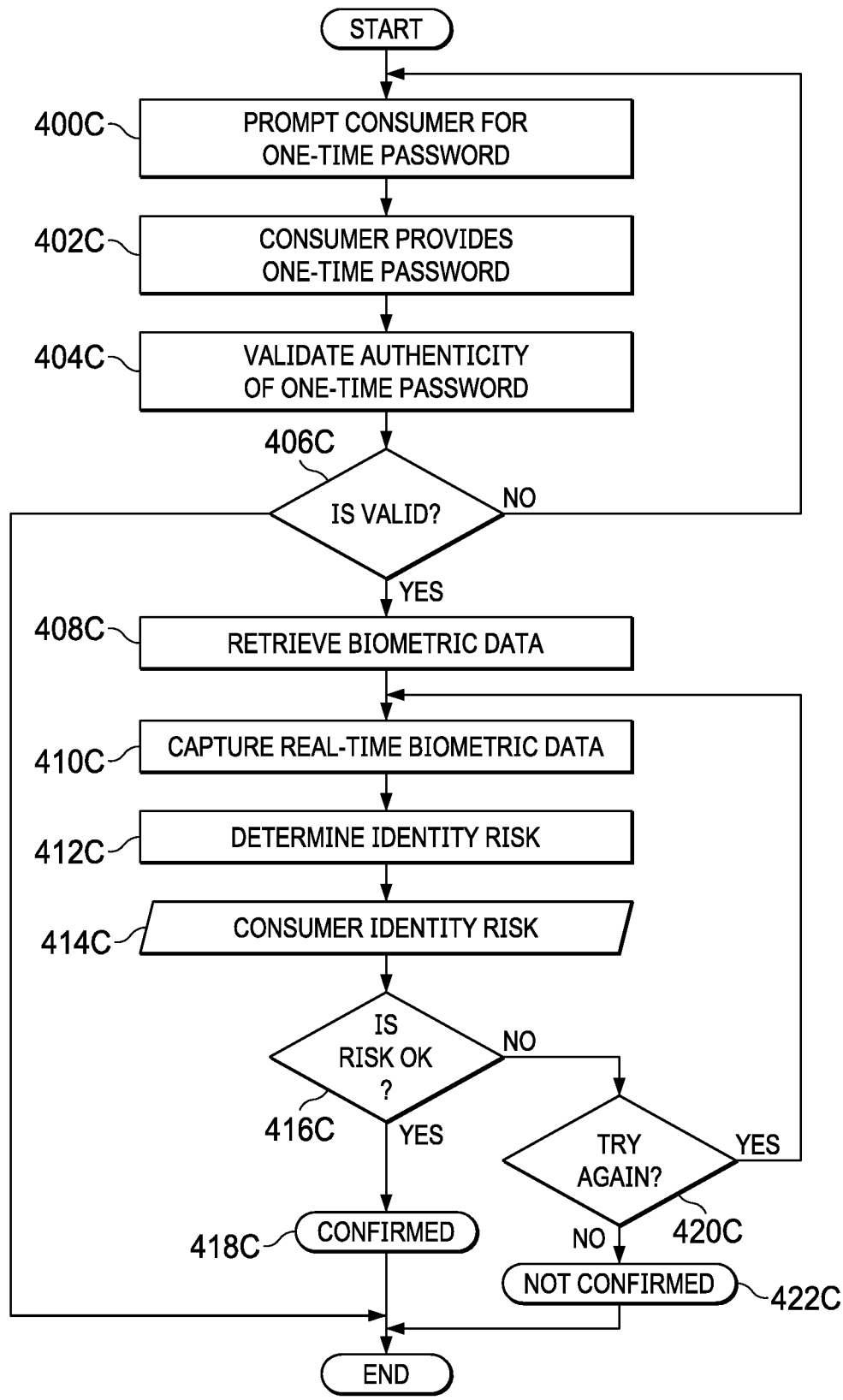

FIG. 4C is a flowchart illustrating an example of identity risk determination with a password and biometric information, in accordance with one or more embodiments. At step 400C, the kiosk prompts a consumer for a one-time password. At step 402C, the consumer provides, and the kiosk receives, the one-time password. At step 404C, the kiosk validates the authenticity of the one-time password (e.g., the kiosk may require a total match between the one-time password provided and a known password stored on a trusted source provided to the kiosk).

At step 406C, the kiosk then determines whether the government photo identification is valid. If the government photo identification is not valid, then the process may return to step 400C and repeat, either to retry the process with the government photo identification or to provide a new government photo identification. Alternatively, the method my terminate.

However, if the kiosk determines that the government photo identification is valid (a "yes" determination at step 406C), then at step 408C the kiosk retrieves biometric data from the government photo identification. For example, the kiosk may scan the photograph of the consumer's face.

Then, at step 410C, the kiosk captures real-time biometric data regarding the consumer. For example, the kiosk my take a photograph of the user's face.

At step 412C, the kiosk determines an identity risk for the consumer. The determination of the identity risk depends on the degree of match between the face in the government photo identification and the face in the photograph that the kiosk took, the level of access desired by the user, etc., as described with respect to FIG. 1 through FIG. 3. At step 414C, the kiosk then compares the consumer identity risk to a pre-determined set of rules.

At step 416C, the kiosk determines whether the risk is "OK" (i.e., satisfied). If "yes" at step 416C, then the user's identity is confirmed, and the kiosk allows the user to continue the desired use of the kiosk at step 418C. However, the security check method is terminated. Otherwise, for a "no" result at step 416C, then at step 420C the kiosk makes another determination whether to try again. If so (a "yes" determination at step 420C), then the process repeats from step 410C. Otherwise, (a "no" determination at step 420C), then the kiosk determines at step 422C that the identity is not confirmed, and the method terminates.

Figure 4D:
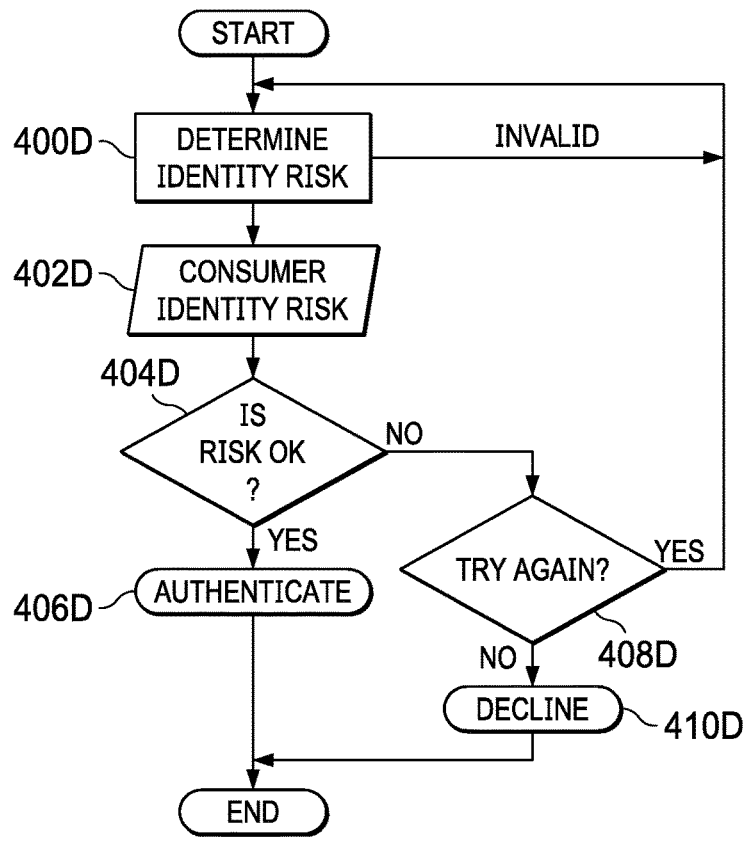

FIG. 4D is a flowchart illustrating another method for performing an authentication, in accordance with one or more embodiments. In the example of FIG. 4D, the consumer selects this method of authentication. At step 400D, the kiosk determines an identity risk of the consumer. At step 402D, the kiosk applies rules to determine the degree of identity risk associated with the desired transaction. At step 404D, if the risk is "OK" (i.e., satisfied, or a "yes" determination at step 404D), then the kiosks authenticates the transaction at step 406D, and the desired transaction continues. However, the security method terminates.

However, if the risk is not "OK" (i.e., not satisfied, or a "no" determination at step 404D), then the kiosk determines whether to try again at step 408D. If "yes" at step 408D, then the process returns to step 400D and repeats. Otherwise, for a "no" at step 408D, the desired transaction is declined at step 410D, and the method terminates.

Figure 4F:
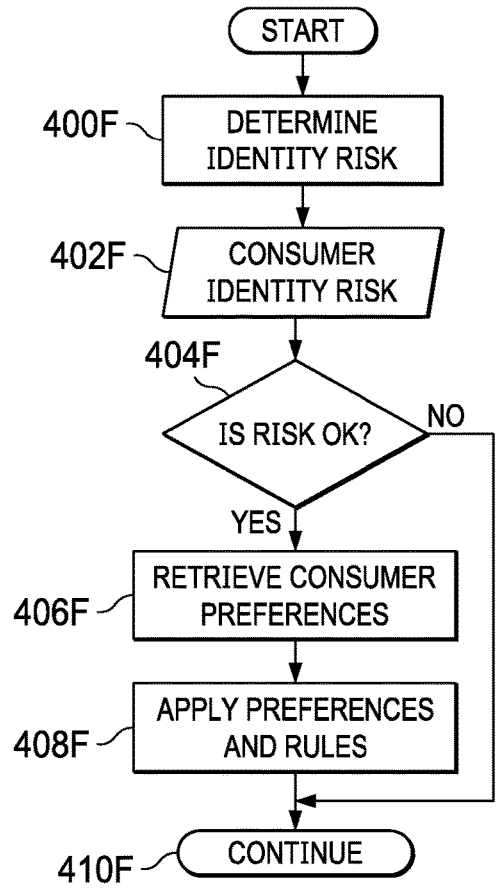
Figure 4E:
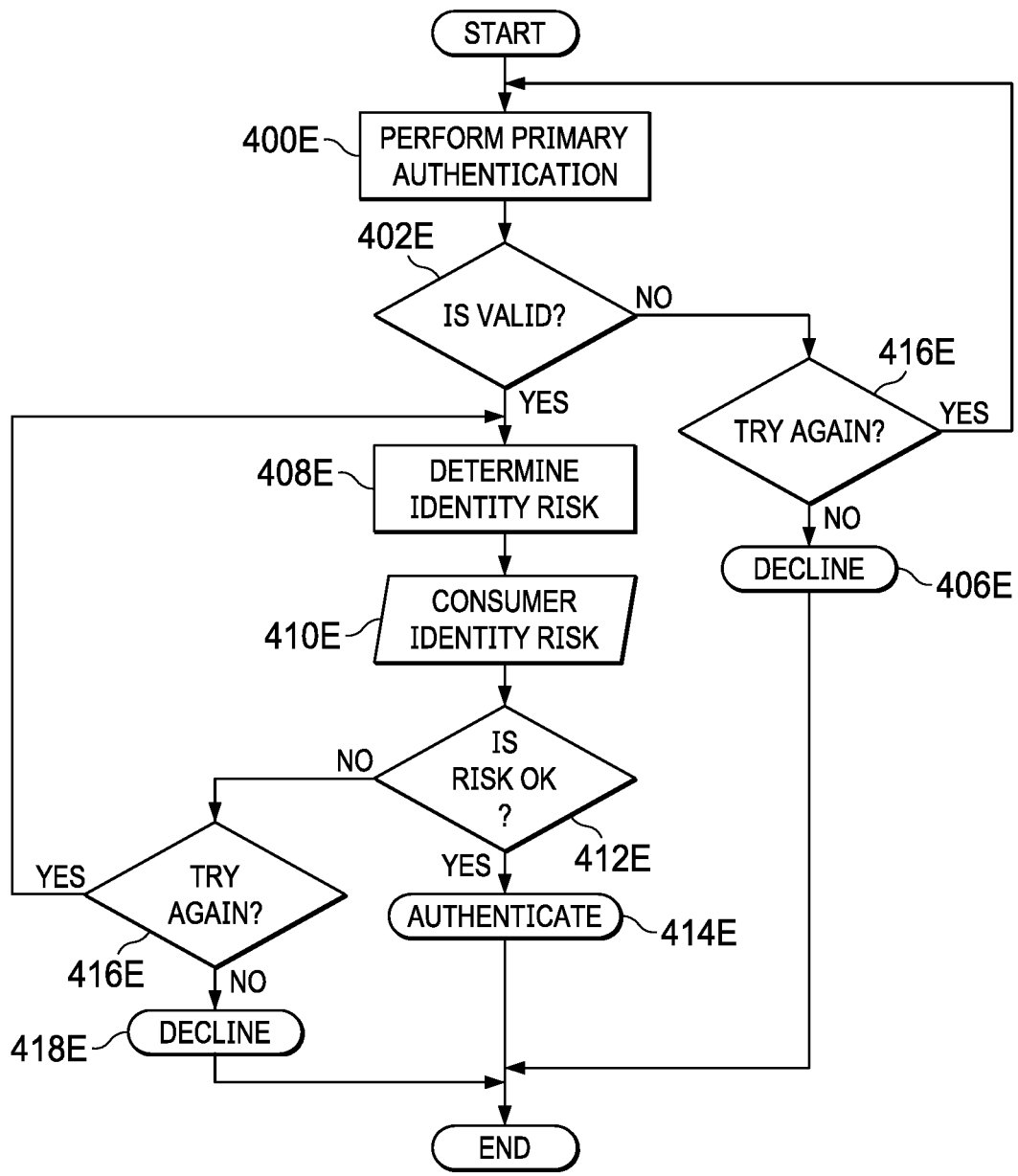

FIG. 4E is a flowchart illustrating a method for performing identity risk determination for secondary authentication, in accordance with one or more embodiments. At step 400E, the kiosk first performs primary authentication by requiring the consumer to complete a first security step. The first security step might be to provide a password, provide a trusted security device, etc.

At step 402E, the kiosk determines if the primary authentication is valid. If the primary authentication is not valid (a "no" determination at step 402E), then the kiosk determines at step 404E whether to try again. If the kiosk is to try again, then the method returns to step 400E and repeats. Otherwise, (a "no" determination at step 404E), then at step 406E the kiosk declines access to the user, and the method terminates.

Returning to step 402E, if the primary authentication was valid (a "yes" determination at step 402E), then the kiosk at step 408E determines an identity risk of the consumer. The determination of the identity risk depends on the degree of match between provided biometric information and sensed biometric information, as described with respect to FIG. 1 through FIG. 3. At step 410E, the kiosk then compares the consumer identity risk to a pre-determined set of rules.

At step 412E, the kiosk determines whether the risk is "OK" (i.e., satisfied). If "yes" at step 412E, then the user's identity is confirmed, and the kiosk allows the user to continue the desired use of the kiosk at step 414E. However, the security check method is terminated. Otherwise, for a "no" result at step 412E, then at step 416E the kiosk makes another determination whether to try again. If so (a "yes" determination at step 416E), then the process repeats from step 408E. Otherwise, (a "no" determination at step 416E), then the kiosk determines at step 418E that the identity is not confirmed, and the method terminates.

FIG. 4F is a flowchart illustrating a method for performing identity risk determination for consumer preferences, in accordance with one or more embodiments. At step 400F the kiosk determines an identity risk of the consumer. The determination of the identity risk depends on the degree of match between provided biometric information and sensed biometric information, as described with respect to FIG. 1 through FIG. 3. At step 402F, the kiosk then compares the consumer identity risk to a pre-determined set of rules.

At step 404F, the kiosk determines whether the risk is "OK" (i.e., satisfied). If "no" at step 404F, then the process continues at step 410F. Continuance of the process at step 410F may include terminating the transaction, requesting another form of identification, allowing a lower level of access, contact of a banking representative, contact of law enforcement, etc.

However, if "yes" at step 404F, then the user's identity is confirmed, and at step 406F the kiosk retrieves consumer preferences. At step 408F the kiosk then applies the preferences and rules received from input provided by the consumer. At step 410F the process continues, such as to allow the user to perform another transaction, terminate the session, etc.

Figure 4G:
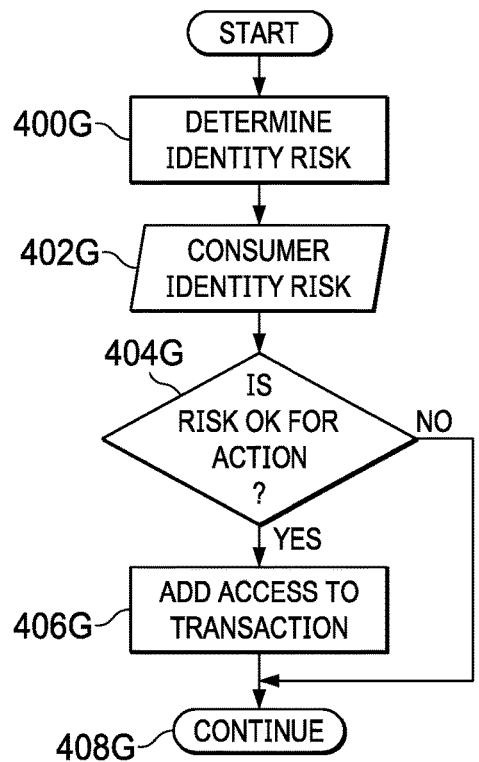

FIG. 4G is a flowchart illustrating a method for performing identity risk determination for granting access to transactions, in accordance with one or more embodiments. At step 400G the kiosk determines an identity risk of the consumer. The determination of the identity risk depends on the degree of match between provided biometric information and sensed biometric information, as described with respect to FIG. 1 through FIG. 3. At step 402G, the kiosk then compares the consumer identity risk to a pre-determined set of rules.

At step 404G, the kiosk determines whether the risk is "OK" (i.e., satisfied) for the specific transaction being requested by the consumer. If "no" at step 404G, then the process continues at step 408G. Continuance of the process at step 408G may include terminating the transaction, requesting another form of identification, allowing a lower level of access, contact of a banking representative, contact of law enforcement, etc.

However, if yes at step 404G, then the user's identity is confirmed, and at step 406G the kiosk adds access to the transaction desired by the consumer. The process then continues at step 408G, and the consume is allowed to proceed with the transaction. Alternatively, if the risk was not OK (a "no" determination at step 404G), then the process again continues at step 408G; however, instead the user is offered to perform a less risky transaction, or the method terminates.

Figure 4H:
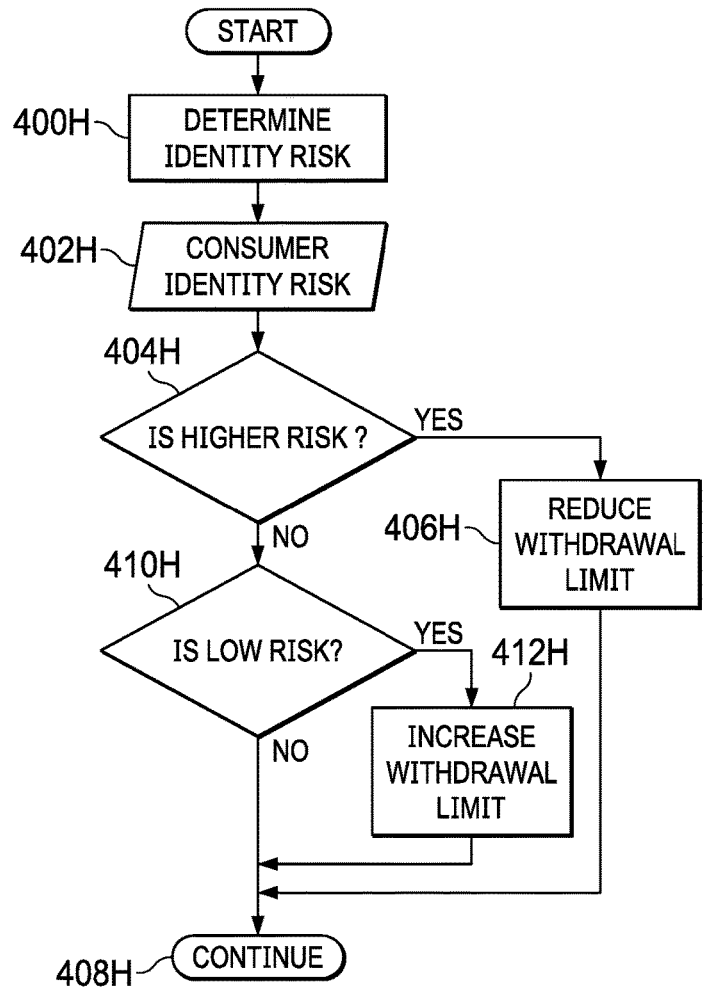

FIG. 4H is a flowchart of a method for performing identity risk determination for adjusting a cash withdrawal limit, in accordance with one or more embodiments. At step 400H the kiosk determines an identity risk of the consumer. The determination of the identity risk depends on the degree of match between provided biometric information and sensed biometric information, as described with respect to FIG. 1 through FIG. 3. At step 402H, the kiosk then compares the consumer identity risk to a pre-determined set of rules.

At step 404H, the kiosk determines at step 404H if the risk level is above a first pre-determined threshold. For example, the kiosk determines if the requested amount of cash withdrawal from the kiosk is considered a higher risk. If yes at step 404H, then at step 406H the kiosk reduces the withdrawal limit of the consumer. The process is then allowed to continue at step 408H, permitting the consumer to withdraw cash at the lower withdrawal limit Returning to step 404H, if the risk associated with the requested transaction is below a second pre-determined threshold, then at step 410H the kiosk determines whether the risk factor is below the second pre-determined threshold. If yes at step 410H, then at step 412H the kiosk increases the withdrawal limit of the consumer. The process then continues at step 408H, with the consumer able to withdraw additional funds.

However, if the risk factor is above the second pre-determined threshold (a "no" determination at step 410H), then the process continues again to step 408H. Continuance of the process at step 410H may include terminating the transaction, requesting another form of identification, allowing a still lower level of access, contact of a banking representative, contact of law enforcement, etc.

The method of FIG. 4H may be generalized to other types of transactions. For example, the method of FIG. 4H could be applied to a deposit limit. Specifically, the U.S. federal government requires reporting on deposits of $10,000 or higher, with identity verified, and thus the method may be applied to deposit limits and not just withdrawal limits. In another example, the method of FIG. 4H could be applied to adding a value to a stored card or mobile wallet, a transfer to an account, etc.

Figure 4I:
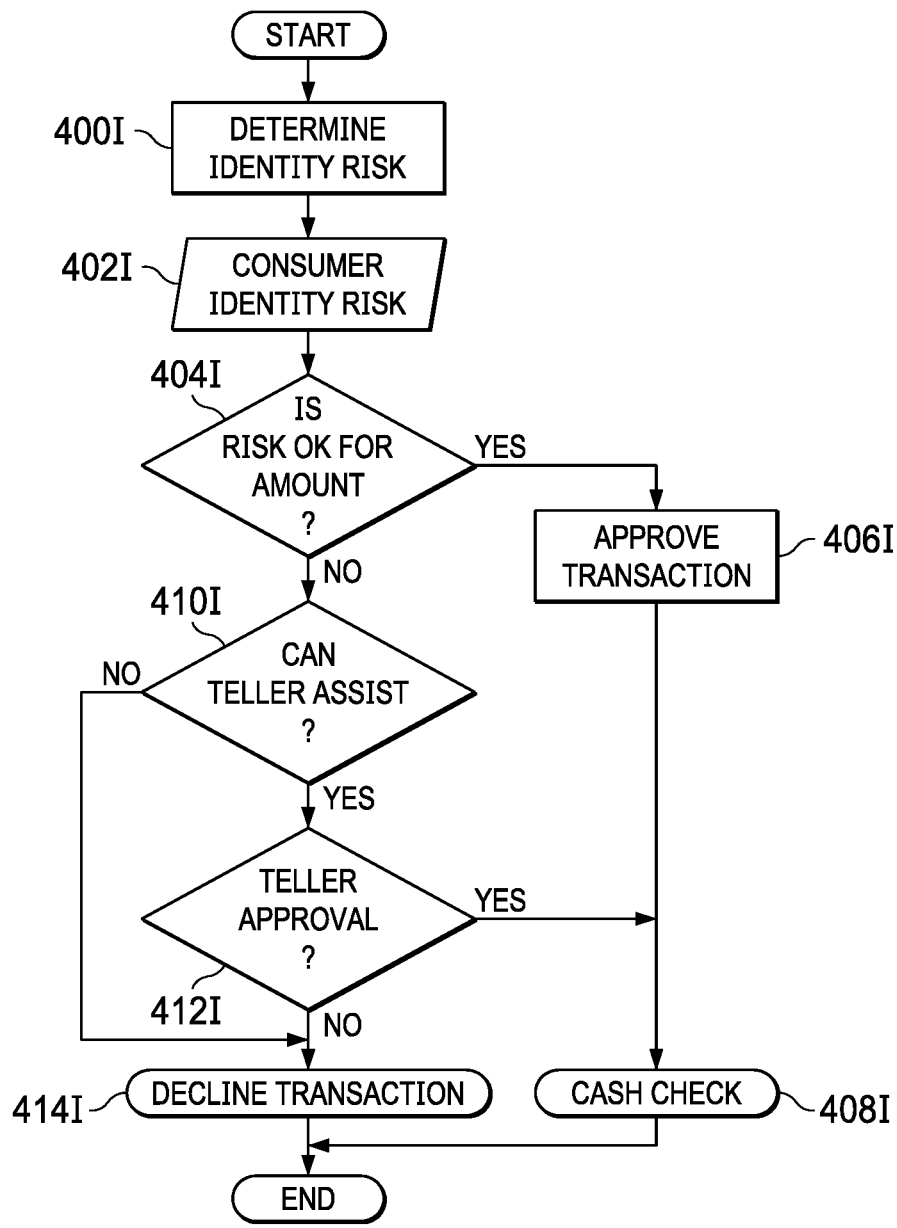

FIG. 4I is a flowchart of a method for performing identity risk determination for automatic check cashing approval, in accordance with one or more embodiments. At step 400I the kiosk determines an identity risk of the consumer. The determination of the identity risk depends on the degree of match between provided biometric information and sensed biometric information, as described with respect to FIG. 1 through FIG. 3. At step 402I, the kiosk then compares the consumer identity risk to a pre-determined set of rules.

At step 404I, the kiosk determines whether the risk is "OK" (i.e., satisfied). If yes at step 404I, then at step 406I, the transaction is approved. In this case, the consumer is allowed, at step 408I, to cash a check. In this case, the process terminates.

Returning to step 404I, if the risk is not "OK" (a "no" determination at step 404I), then the kiosks determines at step 410I whether a teller can assist with the transaction. If not at step 410I, then the transaction is declined at step 414I, and the process terminates. If yes at step 410I, then the kiosk contacts the teller the kiosk determines at step 412I whether teller approval has been received. If yes at step 412I, then the check is cashed as in step 408I, and the process terminates. Otherwise, (a "no" determination at step 412I), the transaction is declined at step 414I, and the method terminates.

The method of FIG. 4I may be varied. For example, there could be other risks that are evaluated before a check is cashed. For example, if a check is being drawn on the bank, the account the check is drawn upon could be checked for sufficient funds. If a check is drawn on another bank or government, the check could be evaluated for fraud. The value of the check could be compared to the customer's holding with the bank. If the cash in the issuing customer's account is less than the value of the issued check, then the check might not be cashed.

Figure 4J:
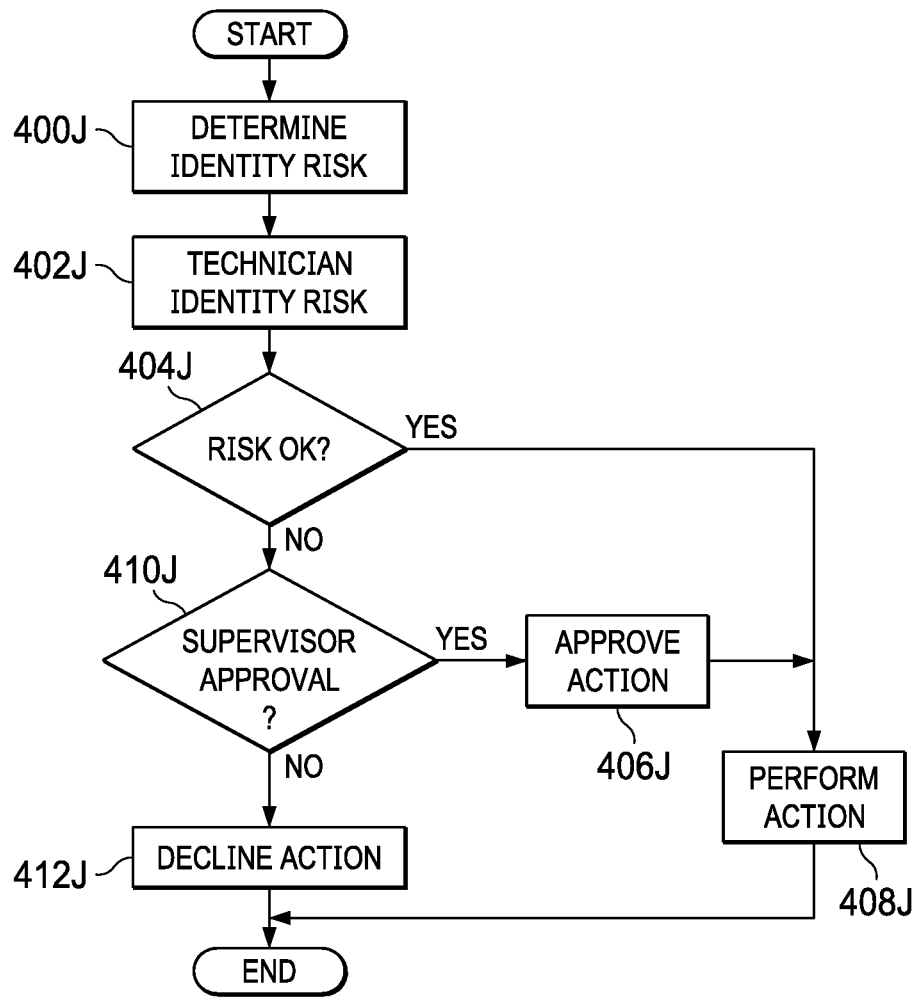

FIG. 4J is a flowchart of a method for performing identity risk determination for automatic technician authentication, in accordance with one or more embodiments. FIG. 4J is applicable when the user of the kiosk is a maintenance technician, a teller, a bank guard, a cash carrier, a supervisor, etc. Thus, as used herein, the term "technician" applies to any technical, managerial, or security personnel (i.e., non-customers).

At step 400J the kiosk determines an identity risk of the technician. The determination of the identity risk depends on the degree of match between provided biometric information and sensed biometric information, as described with respect to FIG. 1 through FIG. 3. At step 402J, the kiosk then compares the consumer identity risk to a pre-determined set of rules. For example, the technician's identity may be compared to a list of authorized technicians with differing access levels, and identify the level of access assigned to a given technician.

At step 404J, the kiosk determines whether the risk is "OK" (i.e., satisfied). If yes at step 404J, then the action may be performed at step 408J. In other words, the technician is allowed, at step 408J, to perform the action. The action may be to grant physical access to the internal machinery of the kiosk, to grant access to a storage bin of cash in the kiosk, to allow a transaction to be performed, electronic or otherwise, to dispense cash, to print logs, or to perform some other managerial, maintenance, or security action. In this case, the process terminates.

Returning to step 404J, if the risk is not "OK" (a "no" determination at step 404J), then the kiosks determines at step 410J whether a supervisor can assist with the transaction. For example, if a particular action is considered especially risky, such as to grant admin level access to a kiosk computer, or to grant access to the cash box of the kiosk, then a supervisor's approval may be needed. The supervisor may be remote from the kiosk, or local, depending on pre-established procedure.

If a supervisor cannot assist at step 410J, then the transaction is declined at step 412J, and the process terminates. If yes at step 410J, then the kiosk contacts the supervisor, and upon receipt of the supervisor's approval, the kiosk approves the action at step 406J. The method then proceeds to step 408J, as described above, to perform or allow the action. In one embodiment, the method of FIG. 4J may terminate thereafter. Otherwise, (a "no" determination at step 410J), the transaction is declined, and the method terminates.

Thus, according to the method of FIG. 4J, a technician may use a company issued ID or mobile application and biometric to validate the technician's identity. The identified technician is compared with a list of who is allowed to access the safe or other secure areas of the kiosk, as well as the degree of access. Thus, the method of FIG. 4J may be used to retrieve deposits, replenish cash, add receipt paper, fix the machine, etc. Prior methods typically use a one-time combination retrieved via mobile phone, or static combination and fob, at the kiosk as a way of identifying a user, which is not as secure as the method of FIG. 4J.

While the various steps in flowcharts of FIG. 2 through FIG. 4I are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Additionally, the one or more embodiments may be further varied. For example, any of the embodiments described with respect to FIG. 2 through FIG. 4J may be used to whitelist or blacklist certain users. In other words, if the degree of security risk or the degree of check failure is severe enough (i.e. below a lower threshold), then a user may be blacklisted and banned from using some or all of the functions of the kiosk and/or its software. Alternatively, if the identity confirmation strong enough and the level of access high enough, a user may be whitelisted and thus granted easier future access to the kiosk and/or its software. It is also possible to perform a combination of whitelisting, for some functions of the kiosk, but blacklisting for other functions of the kiosk.

The one or more embodiments differ from typical kiosk security in that a trusted or verifiable source, be it government issued ID, trusted mobile application or other source, provides identification and biometric information. The trusted source eliminates the need for the kiosk to retain or access financial institution stored identification or biometric information, or for any type of registration. The information provided by the trusted source is compared real-time with information captured at the kiosk and the amount of "trust" in the trusted source to determine a confidence factor. The confidence factor is used to determine how well the consumer's identity has been authenticated. This confidence factor is then combined with activities the consumer is performing on the kiosk to determine a level of consumer identity risk. Certain levels of identity risk allow activities to continue without interruption, other levels can stop activity, or require another confirmation of identity or automatic involvement of bank personnel.

When comparing stored and sensed biometric data, the lower the confidence of a match, the higher the consumer identity risk. If the confidence of a match is too low, the identity is not confirmed, and consumer must try again or use another form of identification. If the confidence of a match is high enough, the kiosk uses the consumer identity to control access and apply risk rules to the services offered to the consumer. Information about the trusted source verification, identification information, and identity risk determination may be logged to enable research and dispute resolution.

One implementation of this consumer identity risk method is for authentication. In this implementation, a consumer identity risk that is low enough grants authentication, while a consumer identity risk that is too high denies authentication or requires addition identification. This method of authentication could be used for primary authentication, or this method could be used for secondary authentication to increase the confidence of the consumer identity when paired with another form of authentication.

Another implementation of this consumer identity risk method is for handling consumer preferences. If the consumer identity risk is low enough that the identity of the consumer has been confirmed to the appropriate risk level, consumer preferences can be retrieved and used. In addition, lists of available services and transactions, including transactions pre-staged on another channel, can be tailored and presented to the consumer based on the consumer identity and business rules set by the financial institution. Examples of customer preferences could be language, favorite transactions or services, color schemes and images, receipt preferences, etc.

A further implementation of this consumer identity risk method is for applying custom risk rules. In this implementation, the consumer identity risk method is used to establish a level of confidence in the claimed identity of the consumer. A consumer with a higher confidence level may be granted access to additional services and/or less restrictive rules than consumers with a lower confidence level or consumers that do not provide consumer identity risk information.

Still other implementations are contemplated. Thus, the one or more embodiments are not necessarily limited to the examples provided above.

Figure 5A:
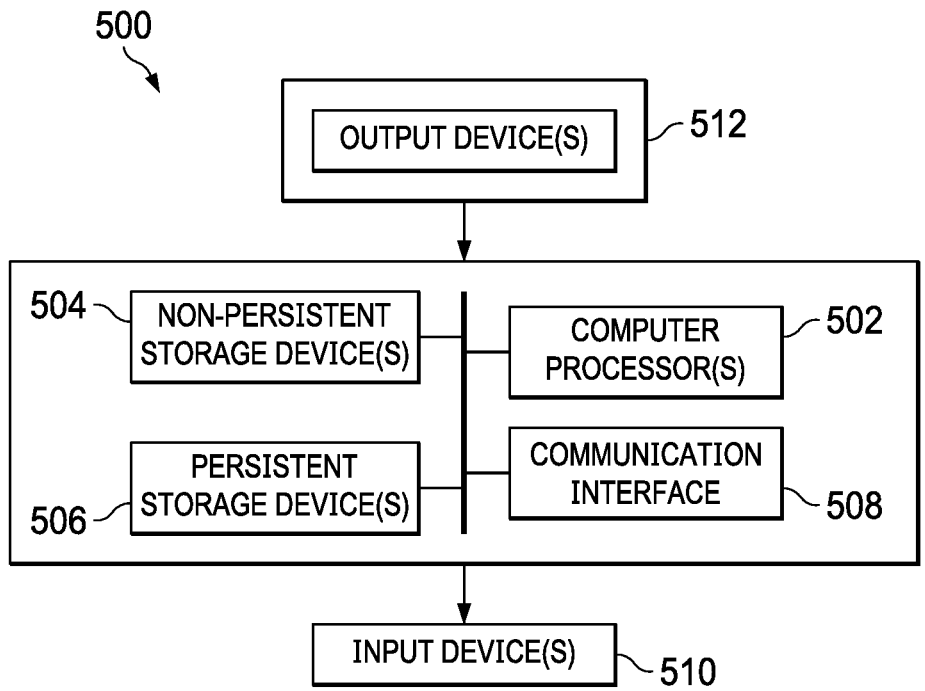
FIG. 5A and FIG. 5B show a computing system and network environment, in accordance with one or more embodiments of the invention.
Figure 5B:
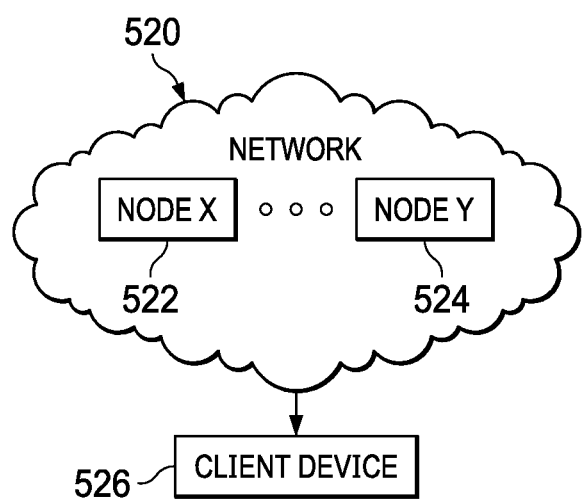

FIG. 5A and FIG. 5B are examples of a computing system and a network, in accordance with one or more embodiments of the invention. Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage device(s) (504) (e.g., volatile memory, such as random access memory (RAM), cache memory), persistent storage device(s) (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (508) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (512), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage device(s) (504), and persistent storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    receiving, in a receptacle of a security device and from a user, an object storing stored biometric data describing a biometric parameter of the user;
    reading the stored biometric data from the object;
    generating sensed biometric data by sensing directly, using a biometric sensor of the security device, the biometric parameter of the user;
    comparing the stored biometric data to the sensed biometric data;
    determining a confidence factor using a first degree of trust, assigned to the object, combined with a second degree of match between the stored biometric data and the sensed biometric data;
    receiving, from an input device of the security device, a user input indicating a desired activity to be taken with respect to the security device;
    determining a risk factor based on a combination of the confidence factor and the user input;
    comparing the risk factor to a selected pre-determined threshold; and
    granting, to the user, a selected level of access to the security device from among a plurality of levels of access to the security device when the risk factor satisfies the selected pre-determined threshold.

2. The method of claim 1, further comprising:
    selecting the selected pre-determined threshold from among a plurality of pre-determined thresholds, wherein selecting is performed by using the confidence factor and the user input to select a security rule, and then applying the security rule to the risk factor to select the selected pre-determined threshold.

3. The method of claim 2, further comprising:
    taking, by the security device, a security action when the risk factor fails to satisfy a second selected threshold of the plurality of pre-determined thresholds.

4. The method of claim 3, wherein the security action is selected from the group consisting of:
    requesting the user to provide a secondary form of identification;
    connecting the security device to a live security agent to further verify the user; and
    preventing the user from accessing a higher access level that is higher than the selected level of access.

5. The method of claim 1, further comprising, prior to generating the sensed biometric data:
    prompting the user to input a passcode;
    receiving, from the user, an entered passcode;
    comparing the entered passcode to a known passcode; and
    responsive to the entered passcode being different than the known passcode, taking a security action.

6. The method of claim 1, wherein the selected level of access is selected from the group consisting of:
    allowing the user to designate user preferences;
    allowing the user to enter additional security information in order to access a higher level of access relative to the selected level of access;
    opening the security device;
    allowing the user to withdraw a pre-determined number of objects from the security device; and
    allowing the user to perform a first selected transaction within a software program with which the security device is in communication, but also preventing the user from performing a second selected transaction within the software program, wherein performing the second selected transaction requires a higher level of access than the selected level of access.

7. A method of operating an automated kiosk, comprising:
    receiving, in proximity to a receptacle of the automated kiosk and from a user, an identity device storing stored biometric data describing a biometric parameter of the user;
    generating sensed biometric data by sensing directly, using a biometric sensor of the automated kiosk, the biometric parameter of the user;
    comparing the stored biometric data to the sensed biometric data;
    determining a confidence factor using a first degree of trust, assigned to the identity device, combined with a second degree of match between the stored biometric data and the sensed biometric data;
    receiving, from an input device of the automated kiosk, a user input indicating a type of transaction desired by the user;
    determining a risk factor based on a combination of the confidence factor and the user input;
    comparing the risk factor to a selected pre-determined threshold; and
    preventing the user from performing the type of transaction when the risk factor fails to satisfy the selected pre-determined threshold.

8. The method of claim 7, further comprising:
    responsive to preventing the user from performing the type of transaction, prompting the user to provide additional authentication; and
    responsive to providing the additional authentication, allowing the user to perform the type of transaction.

9. The method of claim 7, further comprising:
    responsive to preventing the user from performing the type of transaction, contacting a remote device operable by a remote user;
    communicating, via the remote device and the automated kiosk, an authentication requested by the remote user to the user; and
    allowing, responsive to a command transmitted from the remote device to the automated kiosk, the user to perform the type of transaction.

10. The method of claim 7, further comprising:
    allowing the user to perform a second transaction, different than the type of transaction, wherein the second transaction is associated with second risk factor that satisfies a second selected pre-determined threshold.

11. The method of claim 7, further comprising, prior to generating the sensed biometric data:
    prompting a user to input a passcode;
    receiving, from the user, an entered passcode;
    comparing the entered passcode to a known passcode; and
    responsive to the entered passcode being different than the known passcode, taking a security action.

12. The method of claim 7 further comprising:
after preventing, prompting the user to provide to the automated kiosk a different type of identification storing a second stored biometric parameter, different than the biometric parameter;
generating second sensed biometric data by sensing directly, using a second biometric sensor of the automated kiosk, the second biometric parameter of the user;
comparing the second stored biometric parameter to the second sensed biometric data;
determining a second confidence factor using a third degree of trust, assigned to the different type of identification, combined with a fourth degree of match between the second stored biometric data and the second sensed biometric data;
determining a second risk factor based on a combination of the second confidence factor and the user input;
comparing the second risk factor to a second selected pre-determined threshold; and
allowing the user to perform the type of transaction when the second risk factor satisfies the second selected pre-determined threshold.

13. A kiosk comprising:
a receptacle disposed in a frame;
a reader disposed to read an identity device placed in proximity to the receptacle;
a display device connected to the frame;
an input device connected to the frame and in electronic communication with the display device;
a processor connected to the frame and in electronic communication with the display device and the input device;
a biometric sensor connected to the frame and in electronic communication with the processor;
a non-transitory computer readable storage medium connected to the frame and in electronic communication with the processor, wherein the non-transitory computer readable storage medium stores computer readable program code which, when executed by the processor, performs a computer-implemented method of controlling one or both of the kiosk and software to which the kiosk has access, the computer-implemented method comprising:
responsive to detecting insertion of the identity device in the receptacle, reading, from the identity device, stored biometric data describing a biometric parameter of a user;
generating sensed biometric data by sensing directly, using the biometric sensor, the biometric parameter of the user;
comparing the stored biometric data to the sensed biometric data;
determining a confidence factor using a first degree of trust, assigned to the identity device, combined with a second degree of match between the stored biometric data and the sensed biometric data;
receiving, from the input device, a user input indicating a transaction desired by the user;
determining a risk factor based on a combination of the confidence factor and the user input;
comparing the risk factor to a selected pre-determined threshold; and
allowing, responsive to the risk factor satisfying the selected pre-determined threshold, the user to perform a transaction via the input device.

14. The kiosk of claim 13, wherein the computer readable program code is further configured such that, when executed by the processor, the computer-implemented method further comprises:
selecting the selected pre-determined threshold from among a plurality of pre-determined thresholds, wherein selecting is performed by using the confidence factor and the user input to select a security rule, and then applying the security rule to the risk factor to select the selected pre-determined threshold.

15. The kiosk of claim 14, wherein the computer readable program code is further configured such that, when executed by the processor, the computer-implemented method further comprises:
taking, by processor, a security action when the risk factor fails to satisfy a second selected threshold of the plurality of pre-determined thresholds.

16. The kiosk of claim 15, wherein the security action is selected from the group consisting of:
requesting the user to provide a secondary form of identification;
connecting the kiosk to a live security agent to further verify the user; and
preventing the user from performing a second transaction different than the transaction.

17. The kiosk of claim 13, wherein the computer readable program code is further configured such that, when executed by the processor, the computer-implemented method further comprises, prior to generating the sensed biometric data:
prompting a user to input a passcode;
receiving, from the user, an entered passcode;
comparing the entered passcode to a known passcode; and
responsive to the entered passcode being different than the known passcode, taking a security action.

18. The kiosk of claim 13, wherein the transaction is selected from the group consisting of:
allowing the user to designate user preferences;
allowing the user to enter additional security information in order to access a second transaction; and
allowing the user to withdraw a pre-determined number of objects from the kiosk.

19. The kiosk of claim 13, wherein the computer readable program code is further configured such that, when executed by the processor, the computer-implemented method further comprises:
concurrently with allowing the user to perform the transaction, preventing the user from performing a second transaction within the software, wherein grant of access to the second transaction is associated with a second risk factor determined from the first degree of trust and the second degree of match, the second risk factor failing to satisfy a second threshold selected for the second transaction.

20. The kiosk of claim 13, wherein the computer readable program code is further configured such that, when executed by the processor, the computer-implemented method further comprises:
responsive to the risk factor failing to satisfy the pre-determined threshold, performing a security action selected from the group consisting of:
preventing the user from performing the transaction;
prompting the user to provide additional authentication;
establishing communication, via a communication device disposed in the frame and in communication with the processor, with a remote device through which a remote user communicates with the user;

displaying, to the user, one or more different transactions to which the user has been granted access based on the risk factor; and
a combination thereof.

* * * * *